(12) United States Patent
Klotz et al.

(10) Patent No.: US 9,032,837 B2
(45) Date of Patent: May 19, 2015

(54) PENDULUM ABSORBER SYSTEM

(75) Inventors: James R. Klotz, Clinton Township, MI (US); Bruce Geist, Sterling Heights, MI (US); Jerry P. Harkey, Bloomfield Hills, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 1235 days.

(21) Appl. No.: 12/535,899

(22) Filed: Aug. 5, 2009

(65) Prior Publication Data

US 2011/0031058 A1    Feb. 10, 2011

(51) Int. Cl.
*B60K 17/24* (2006.01)
*F16F 7/10* (2006.01)
*F16F 15/14* (2006.01)

(52) U.S. Cl.
CPC .................................. *F16F 15/145* (2013.01)

(58) Field of Classification Search
CPC ......... F16F 15/145; F16F 15/30; F16F 15/14; F16F 15/00; F16F 15/315; F16F 15/1202; F16F 7/104; F16F 7/10; F16F 7/1028; F16H 2045/0263; F16H 2045/0221; F16H 2045/0226; F16H 57/028; F16D 3/12
USPC .................. 74/574.2, 574.4, 572.2, 464/180; 188/378–380; 192/30 V, 70.17, 207
See application file for complete search history.

(56) References Cited

U.S. PATENT DOCUMENTS

| | | | | |
|---|---|---|---|---|
| 2,387,776 | A | * | 10/1945 | Salomon ...................... 74/574.2 |
| 5,495,924 | A | * | 3/1996 | Shaw et al. ................... 188/378 |
| 5,884,735 | A | * | 3/1999 | Eckel et al. ................... 188/378 |
| 6,067,876 | A | * | 5/2000 | Lohaus ........................ 74/574.4 |
| 6,109,134 | A | | 8/2000 | Sudau |
| 6,374,698 | B1 | * | 4/2002 | Carlson et al. ............... 74/570.2 |
| 6,382,050 | B1 | * | 5/2002 | Carlson et al. ............... 74/570.2 |
| 6,427,656 | B1 | * | 8/2002 | Drecq et al. ................ 123/192.1 |
| 6,450,065 | B1 | * | 9/2002 | Eckel et al. .................. 74/574.4 |
| 2002/0046623 | A1 | * | 4/2002 | Carlson et al. .................. 74/574 |
| 2008/0099258 | A1 | * | 5/2008 | Berhan ........................ 180/65.2 |
| 2011/0179782 | A1 | * | 7/2011 | Huegel et al. ................... 60/338 |

* cited by examiner

*Primary Examiner* — Richard W Ridley
*Assistant Examiner* — Richard Urbanski
(74) *Attorney, Agent, or Firm* — Ralph E Smith (57) ABSTRACT

A pendulum absorber system attenuates torsional vibrations within a drive train of a vehicle. The system can be incorporated between an engine and an automatic transmission, for example, within a flex plate assembly attached to an engine's crankshaft, within a pump housing cover of a torque converter, or as a stand-alone unit between a flex plate assembly and a torque converter. The system includes at least one pendulum weight that dynamically moves along a predetermined path in response to variations in rotational velocities of a housing of the system and that is tuned to attenuate excitation of torsional vibrations within the drive train. A limiter assembly, which can include multiple limiters, is provided within the system for stopping movement of the weight when it reaches endpoints of the predetermined path, by mechanically impeding further movement at both of a first and second end of the weight.

24 Claims, 7 Drawing Sheets

PENDULUM ABSORBER SYSTEM

FIELD

The present invention relates to vibration control or management and more particularly to an absorber system that reduces torsional driveline vibrations at predetermined frequencies.

BACKGROUND

Devices that reduce manifestations of vibrations in rotating machines are well known in the art. Managing vibrations can be a particularly important consideration in motor vehicle design because a vehicle must carry passengers while providing acceptably low levels of NVH (noise, vibration, and harshness) stimulus to the passengers.

It is known that vehicles exhibit vibrations that contribute to NVH levels in a variety of ways. Some of the most influential contributors of vehicle vibrations include rotating imbalanced masses throughout the vehicle's drive train and wheels, drive train inertial forces, and various engine related vibration. Of the various engine related vibrations, combustion based and other torsional vibrations within a drive train can be the most dominant contributor to NVH level, especially at low engine speeds.

Combustion based torsional vibrations are established during operation of a reciprocating internal combustion engine by the periodic forces which are applied to the crankshaft. Such periodic forces include force components with mechanical moments that vary angularly around the crankshaft's axis of rotation over time. In other words, a crankshaft's rotational speed and torque are not constant over time, but rather are irregular or vary over time as a function of occurrences of combustion events. Combustion based torsional vibrations have an order value which is equal to one-half of the number of cylinders in the engine. That is because, in a four-stroke engine, two complete revolutions of the crankshaft are required for each piston/connecting rod assembly to undergo a power stroke that drives the crankshaft, whereby during a single revolution of the crankshaft, only one-half of the piston/connecting rod assemblies undergo a power stroke. Correspondingly, when considering four-stroke engines, a two-cylinder engine exhibits a $1^{st}$ order combustion based torsional vibration, a four-cylinder engine exhibits a $2^{nd}$ order combustion based torsional vibration, a six-cylinder engine exhibits a $3^{rd}$ order combustion based torsional vibration, etc.

For a given vehicle power requirement, for example, an amount of power needed to propel a vehicle at a particular speed, torsional vibrations will be more severe in an engine operating at a lower speed than an engine operating at a higher speed. That is because power is proportional to the product of speed multiplied by torque, whereby an engine operating at a lower speed requires relatively more torque to than does an engine operating at a greater speed in order to achieve an equivalent power output value. Correspondingly, engines operating at lower speeds apply larger torque forces to the crankshaft (albeit less frequently) than engines which operate at greater speeds. Such large torque forces in the relatively slower running engines can create strong and distinct crankshaft loading and unloading events which can produce correspondingly large torsional vibrations. Therefore, at low operational speeds, engines can experience combustion based torsional surging events that produce unacceptable NVH levels.

A related concept is that, for an equivalent power output and equivalent engine operating speed, the magnitude of torsional vibrations varies as a function of cylinder-count, whereby engines having fewer cylinders experience larger torsional vibrations than do engines having more cylinders, at such given engine power output and engine speed. That is because during a single crankshaft revolution, an engine having fewer cylinders produces fewer power strokes than an engine having more cylinders. In this regard, to produce an equivalent amount of power at an equivalent operating speed, an engine with fewer cylinders must provide more torque per power stroke than does an engine having more power cylinders. The larger torque values per power stroke in the engines having fewer cylinders can create torsional disturbances in the rotating crankshaft which can lead to undesired torsional vibrations.

Even though low speed and low cylinder-count torsional vibration issues are known, there has been an increasing demand for vehicles that can be propelled by engines operating at low engine operating speeds. That is because vehicle fuel economy is growing increasingly important and fuel economy is directly related to engine operating speed. Namely, to produce an equivalent amount of power, an engine that operates at a lower speed and higher torque is more fuel efficient than an engine that operates at a higher speed and lower torque. Accordingly, vehicle manufacturers have developed engine technologies that allow engines to operate at relatively low RPMs, while providing great enough torque to suitably propel the vehicles at desired speeds. An example of such efforts includes Chrysler's Multi-Displacement System (MDS) that selectively deactivates cylinders at various times during operation, based on performance needs.

Such MDS efforts have proven beneficial and successfully increase fuel economy during vehicle use. Although these systems are successful and sufficient, further technological developments could prove desirable. For example, when cylinders are deactivated by the MDS, engine operating speeds are typically rather low and therefore within a speed range at which torsional vibration excitation can be realized. Furthermore, when MDS deactivates cylinders, the excitation order of the engine is decreased which can increase the magnitude of each torque application made to the crankshaft, when compared to producing an equivalent amount of power using all of the engine's cylinders.

Known techniques for improving NVH levels, by reducing the amount of torsional vibrations that pass into cabins of automatic transmission vehicles, include disabling lock-up clutches of the torque converters at low engine operating speeds. An engine's torsional vibrations are transmittable through the mechanical coupling of a lock-up clutch, thus through the torque converter itself, and are also transmittable through other drive train components that are downstream of the torque converter. For example, when a lock-up clutch is engaged, the engine's torsional vibrations can be transmitted through the torque converter, through the vehicle's transmission and/or driveshaft and cooperating supporting components, for example, the vehicle's frame or unibody, and then ultimately into the vehicle's cabin, typically by way of the vehicle's seat track and/or steering column and steering wheel. At those locations, the torsional vibrations are noticeable by the vehicle occupants and correspondingly contribute to NVH levels.

Although disabling lock-up clutches of torque converters is known to reduce the amount of engine torsional vibrations that is transmitted into a vehicle's cabin, this solution has at least some drawbacks. For example, disabling lock-up clutches of torque converters reduces fuel economy of the vehicle because the mechanical couplings provided by lock-up clutches are more efficient force transmission devices than the fluid couplings between the respective pumps and rotors of the torque converters. Furthermore, the slip between engine and transmission that arises when lock-up clutches are disengaged causes engine speed to increase and hence fuel consumption to rise.

Besides disabling lock-up clutches of torque converters at low engine operating speeds to reduce transmission of strong torsional vibrations through drive trains, other attempts have been made to reduce magnitudes of the torsional surges and vibrations by, for example, attaching counter weights or damping devices directly to crankshafts. Such damping devices remove rotational energy from the crankshaft and their design is greatly limited by available space within a bottom end or crankcase of the engine. Typically, the damping devices cannot be radially spaced far enough from the crankshafts' axes of rotation to provide sufficient rotational inertia needed to correct strong drive train torsional vibrations. Correspondingly, even when using such devices, strong engine torsional vibrations can be transmitted through drive trains and into the cabins of vehicles.

Other damping devices are provided, not inside of engine crankcases, but rather within or integrated into crankshaft pulleys which drive the engines' belt systems that mount to forward facing ends of crankshafts and drive engines' belt systems. These pulley dampers typically include a weight and some sort of energy dissipating material, often an elastomeric material or a fluid. However, like dampers that are housed inside of crankcases, pulley damper design is greatly limited by available space within the belt pulley (housing) itself. Due to space constraints, the pulley dampers cannot be radially spaced far enough from the crankshafts' axes of rotation to provide sufficient rotational inertia needed to correct strong engine based drive train torsional vibrations.

Attempts have been made to improve various damping devices by providing them with pendulums or weights that move along circular paths or alternative (non-circular) paths in efforts to increase their rotational inertia and thus effectiveness. However, such efforts have proved only modestly successful, since typical implementations of such pendulum devices require "detuning" of the devices which shifts their resonant order further away from the targeted excitation order. For example, it has been found that damping devices having pendulum weights that move along circular paths typically must be detuned to avoid chaotic or amplifier behavior of the pendulums. As for damping devices having pendulum weights that move along alternative paths, these devices typically must be detuned to prevent the pendulums from hitting their motion stops in steady state, which can impart undesired turning moments onto the pendulums. All such detuning efforts reduce the effectiveness of the device(s).

SUMMARY

The present invention is directed to pendulum absorber systems that reduce torsional vibrations within a drive train of a vehicle. The system can be incorporated into or mounted to a rotating component within the vehicle drive train, for example, within a flex plate assembly or a torque converter, or between a flex plate assembly and a torque converter. The system includes at least one pendulum weight that dynamically moves along a predetermined path in response to torsional vibrations which can be realized as variations in rotational velocities of a housing of the system. A limiter assembly, which can include a single or multiple limiters, is provided within the system for stopping movement of the weight when it reaches certain positions along the movement path by mechanically impeding further movement at both of a first and second end of the weight.

Accordingly, an object of the invention is to provide a pendulum absorber system that attenuates drive train torsional vibrations by inputting energy from a rotating component of the drive train and then restoring such energy to such rotating component. Stated another way, the pendulum absorber system mitigates or smoothes out torsional surging. This may be done by allowing a pendulum weight to freely move with respect to an engine's crankshaft, while restricting the pendulum weight to an epicycloidal travel path that takes advantage of angular inertia of the pendulum weight to resist rapid or near instantaneous increases in rotational velocity. The centrifugal force generated by the pendulum weight provides a rotational velocity restoring force that resists rapid or near instantaneous reductions in rotational velocity.

In some embodiments, when the weight moves to either of the first and second stopping positions, the first and second ends of the weight contact a single or pair of limiters simultaneously. By supporting the ends of the weight by limiters positioned outwardly beyond the weight's center of gravity, the weight's travel can be stopped without applying turning moments to the weight which ensures that the weight does not deviate from the intended travel path and timing.

According to some aspects of the invention, the limiters are made from an elastomeric material having a coefficient of restitution of less than about 12%, less than about 10%, less than about 5%, or less than about 3%.

BRIEF DESCRIPTION OF THE DRAWINGS

Preferred exemplary embodiments of the invention are illustrated in the accompanying drawings in which like reference numerals represent like parts throughout, and in which.

Before explaining embodiments of the invention in detail, it is to be understood that the invention is not limited in its application to the details of construction and the arrangement of the components set forth in the following description and illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION

Figure 1:
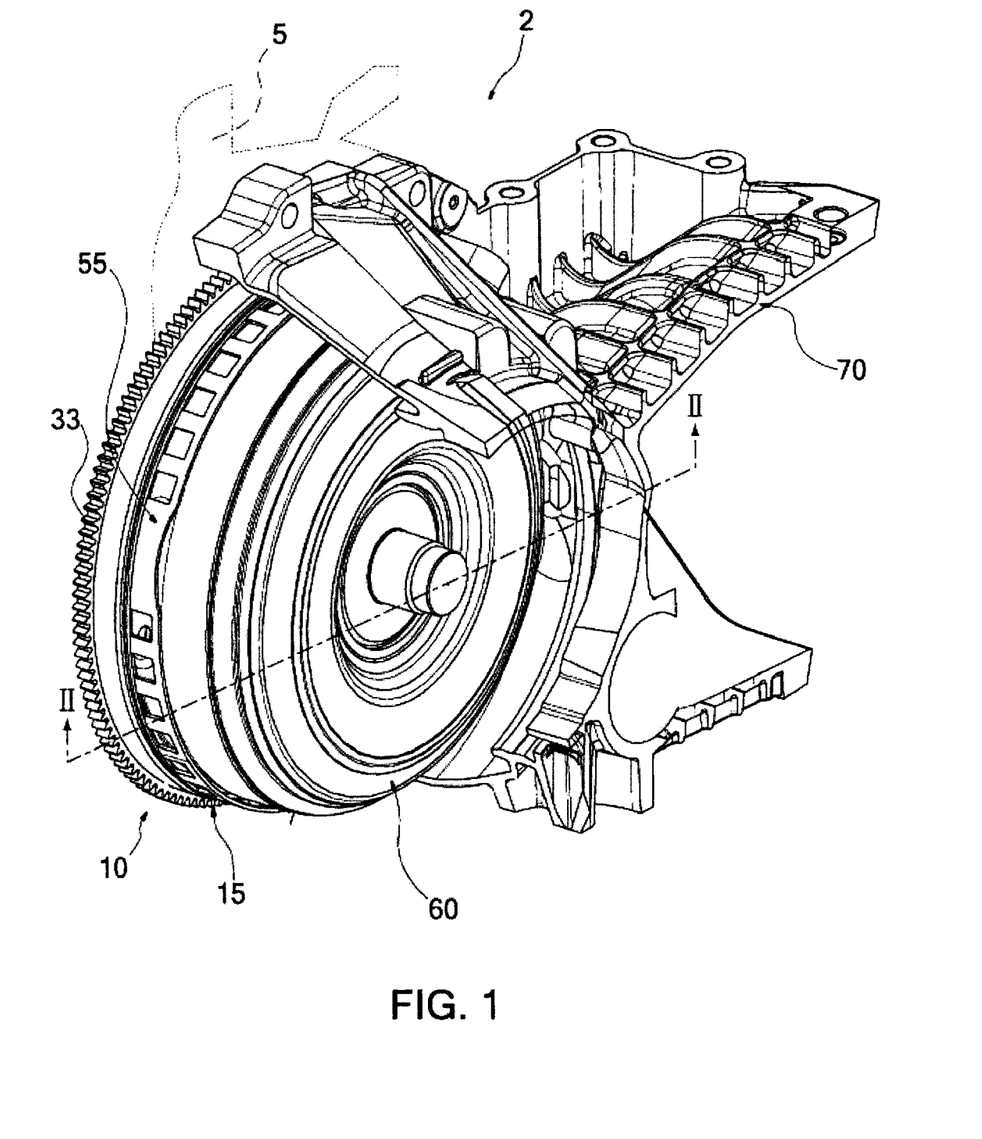
FIG. 1 is an isometric partially cut-away view of portions of a vehicle drive train incorporating a pendulum absorber system according to the present invention.
Figure 2:
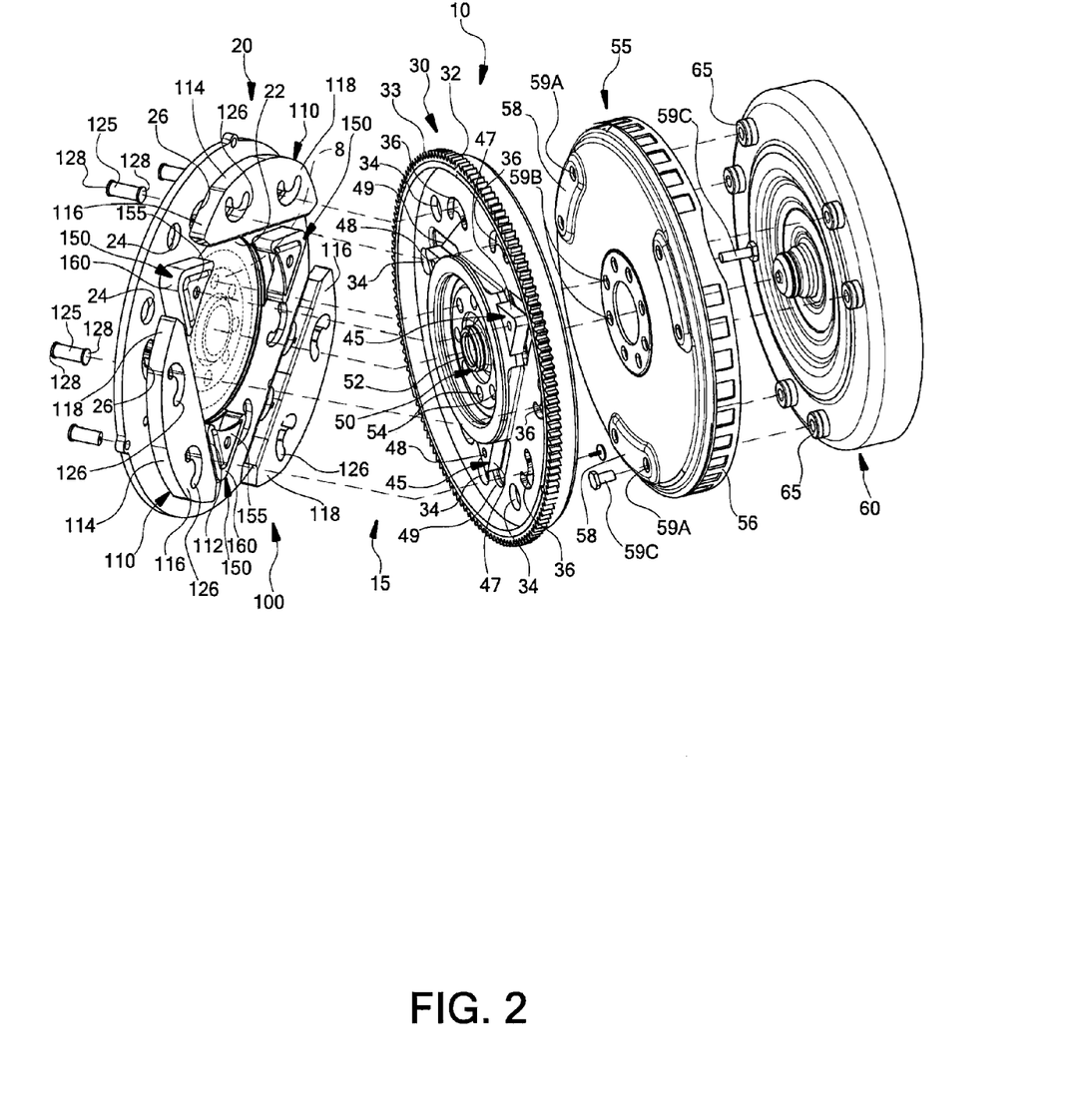
FIG. 2 is an exploded isometric view of the pendulum absorber system of FIG. 1.

FIGS. 1 and 2 illustrate portions of a vehicle drive train 2 that includes an engine having an engine block 5, a crankshaft 7, and a crankshaft flange 8 extending radially from an end of the crankshaft 7 and which are seen best in FIG. 2. Drive train 2 also includes a torque converter 60 that is operably connected to a transmission 70 as seen in FIG. 1 as a mostly cut-away portion of a transmission case. A pendulum absorber system 10 is incorporated into the drive train 2 and is tuned and configured to attenuate torsional vibrations of rotating components within the drive train 2, such as crankshaft 7 or a lock-up clutch within the torque converter.

Figure 3:
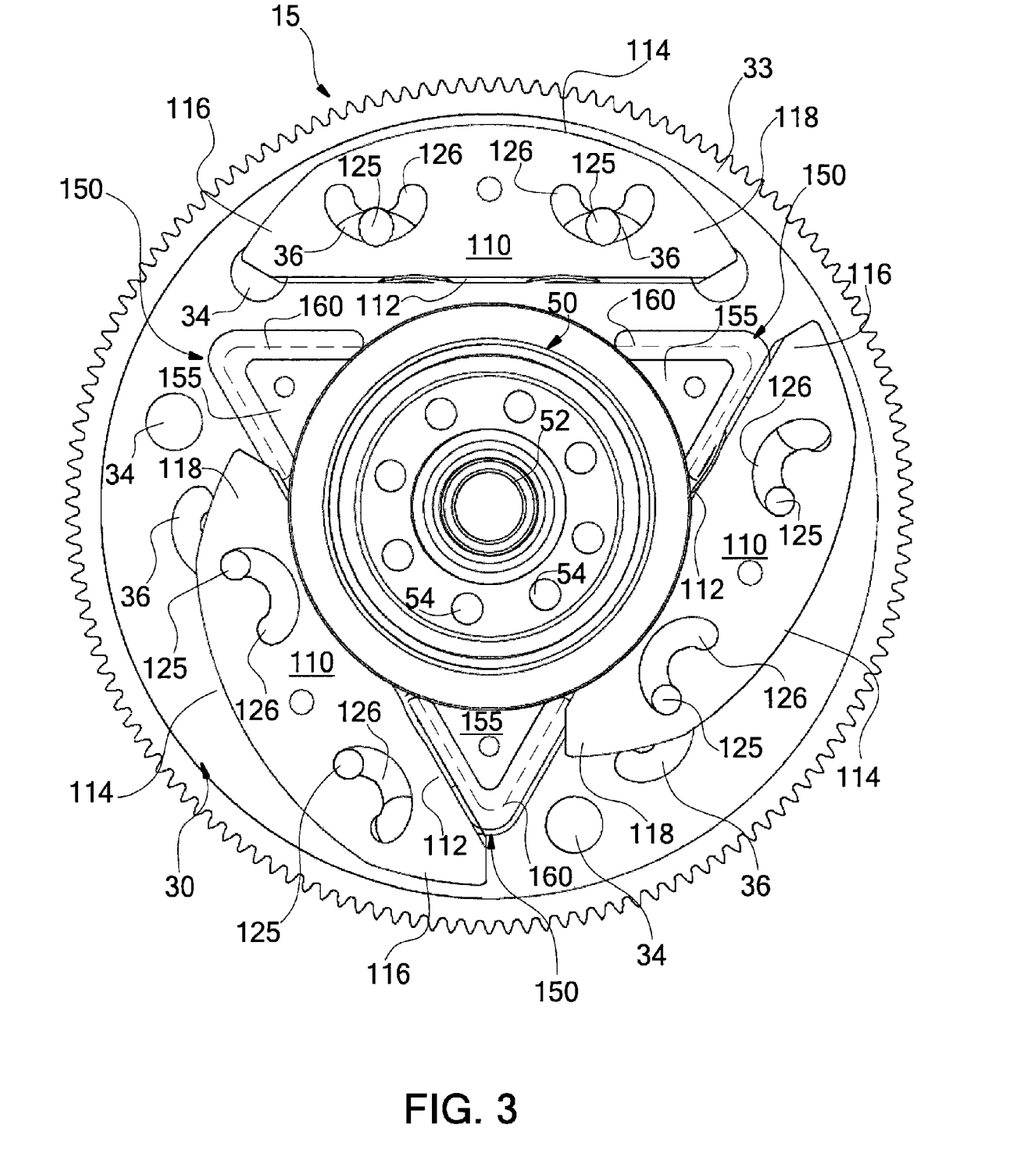
FIG. 3 is a front elevation of the pendulum absorber system of FIG. 1.
Figure 4:
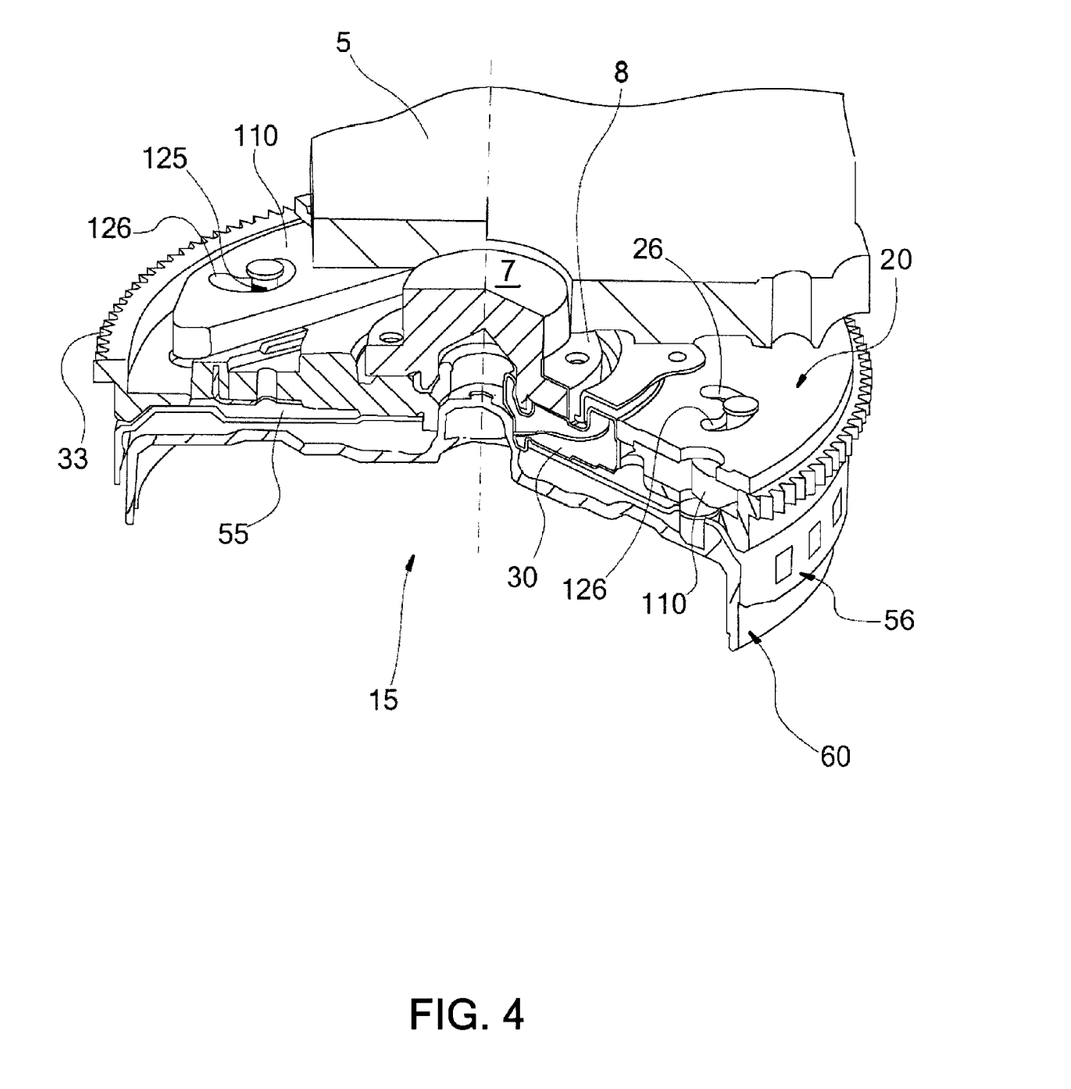
FIG. 4 is an isometric cross-sectional view of the pendulum absorber system of FIG. 1.
Figure 5:
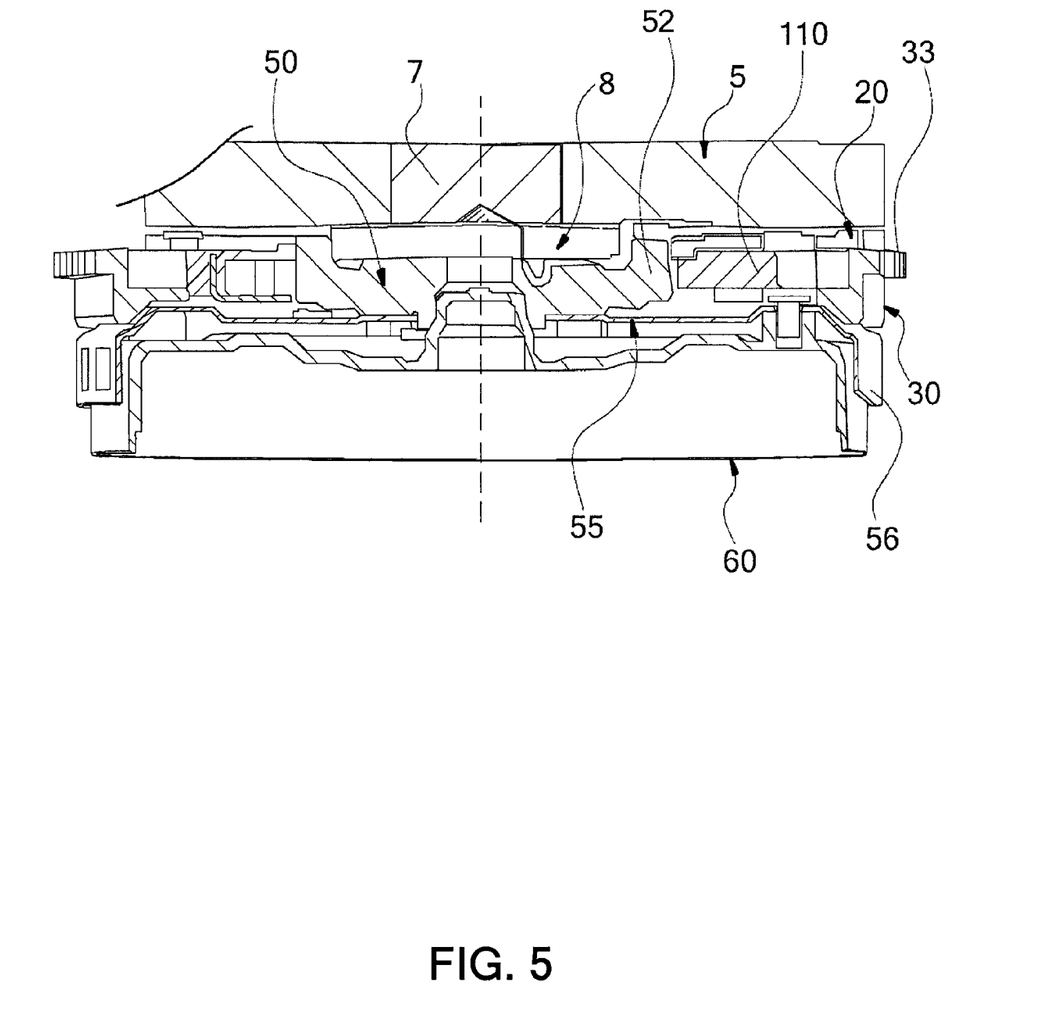
FIG. 5 is a cross-sectional view of the pendulum absorber system of FIG. 1 along a line II-II in FIG. 1.

Referring now to FIGS. 2 and 3, pendulum absorber system 10 includes flex plate assembly 15 and absorber assembly 100 housed therein. The flex plate assembly 15 is a two piece assembly having an inner plate 20 and a hub 30 that are aligned with each other while being axially spaced from each other to define a void space therebetween.

Still referring to FIGS. 2 and 3, inner plate 20 has a round perimeter shape and is substantially planar. A middle opening 22 extends axially through the inner plate 20 and proves a clearance through which the crankshaft flange 8 extends when the pendulum absorber system 10 is mounted to it. Multiple access holes 24 extend through the inner plate 20 near its outer perimeter. The access holes 24 are circumferentially spaced from each other and are aligned with and permit access to screw bosses or lugs 65 that are provided on the pump cover of the torque converter 60.

Still referring to FIGS. 2 and 3, tracks 26 on an outwardly facing surface of the inner plate 20 extend partially or fully through the thickness of the inner plate 20. Each track 26 is arcuate or C-shaped, with the ends facing toward an axis of rotation of the inner plate 20.

Referring now to FIGS. 2-5, hub 30 has a circular shape and a slightly larger diameter than that of inner plate 20. From its outer perimeter, hub 30 has a collar 32 that extends axially toward the inner plate 20. A ring gear 33 extends radially from an outer circumferential surface of the collar 32. A shoulder 35 is defined at an inwardly facing surface of the collar 32 and has a width dimension that defines a width of the void space between the inner plate 20 and hub 30.

Still referring to FIGS. 2-5, multiple access holes 34 extend through the hub 30 and are aligned with access holes 24 and the lugs 65 on the torque converter 60. Tracks 36 on an inwardly facing surface of the hub 30 extend partially or fully through the thickness of the hub 30. The tracks 36 are arcuate or C-shaped, have the same dimensions as, and are aligned with the tracks 26 of inner plate 20.

Still referring to FIGS. 2-5, center flange 50 defines a middle or center of the hub 30. A center collar 52 extends axially, as an annular projection, from center flange 50 in the direction of the inner plate 20. An outer circumferential surface of center collar 52 has a slightly smaller diameter than the middle opening 22 of inner plate 20, allowing the center collar 52 to fit concentrically inside of the middle opening 22 in the complete assemblage. Center flange 50 has multiple throughbores 54 that align with threaded bores of the crankshaft flange 8, allowing bolts 59C to extend therethough and attach the hub 30 to the crankshaft flange 8.

Referring yet further to FIGS. 2-5, shelves 45 have substantially triangular perimeter shapes and extend axially toward the inner plate 20 from a corresponding surface of the hub 30. The shelves 45 are located radially between the access holes 34 and the center flange 50. Three shelves 45 are provided on the hub 30, spaced equidistantly from each other or one hundred and twenty degrees from each other as measured from an axis of rotation of the hub 30. Due to their triangular configurations, each of the shelves 45 has first and second sidewalls 47 that connect to each other at an apex and extend angularly away from such apex point. A hole 48 extends through a middle portion of each of the shelves 45. Toward the outsides of shelves 45, windows 49 extend entirely through the hub 30, next to the sidewalls 47 such that the windows 49 define V-shaped voids extending at least partially about the shelves 45.

Best seen in FIGS. 1 and 2, a speed sensor disc 55 fits between the hub 30 and the torque converter 60, and includes a perforated collar 56 extending axially from its outer perimeter. Perforated collar 56 is positioned to cooperate with a speed sensor, and includes multiple rectangular apertures that allow the speed sensor to detect the rotational speed of the perforated collar 56. Lug wells 58 are recessed into the speed sensor disc 55, projecting toward the hub 30. The lug wells 58 accommodate and house the lugs 65 extending from the torque converter 60, and have holes 59A aligned with access holes 24 and 34 of inner plate 20 and hub 40, respectively.

Referring now to FIG. 2, multiple holes 59B extend through the speed sensor disc 55 in a circular pattern and are aligned with the throughbores 54 of center flange 50 of hub 30. Hex bolts 59C extend through all of the holes and throughbores 54 of the speed sensor 55, hub 30, and inner plate 20 connecting the flex plate assembly 15 to the crankshaft flange 8. Preferably, flat headed fasteners are inserted through the access holes 24 of the inner plate 10 and extend through the access holes 34 of the hub 30 and also the holes in the lug wells 58 of the speed sensor disc 55 to connect the flex plate assembly 15 to the torque converter 60. Flat head fasteners are preferred because they occupy little room within the void space between the inner plate 20 and the hub 30, allowing sufficient clearance for various components of the absorber assembly 100.

Referring again to FIGS. 2 and 3, absorber assembly 100 includes weights 110, pins 125, and a limiter assembly that includes one or more limiters 150 which cooperate with each other to allow the weights 110 to oscillate dynamically in response to changes in rotational velocity of the flex plate assembly 15, purposefully out of phase with torsional vibrations causing such changes in rotational velocity and correspondingly attenuating excitation of such torsional vibrations.

Still referring to FIGS. 2 and 3, each of weights 110 has a generally semicircular perimeter shape with a flat bottom wall 112 that faces the axis of rotation of the flex plate assembly 15. An arcuate top wall 114 extends, as a curve, between first and second ends 116 and 118 of the weight 110. Each of the first and second ends 116, 118 includes a slightly ramped surface that transitions between the bottom and top walls 112, 114 of the first and second ends 116, 118.

Still referring to FIGS. 2 and 3, tracks 126 extend through the entire thickness of each of the weights 110, at or near the ends 116, 118 thereof. Each of the tracks 126 is arcuate or C-shaped, with ends facing away from the axis of rotation of flex plate assembly 15. Preferably, tracks 126 are mirror images of tracks 26 and 36 of inner plate 20 and hub 30, facing the opposite direction. Pins 125 extend through the tracks 126 of weights 110, with ends of the pins either being captured in or extending entirely through the tracks 26 and 36 of inner plate 20 and hub 30. Versions of pins 125 that extend entirely through the inner plate 20 and hub 30 include end caps 128 that axially retain the pins 125 in the tracks 26 and 36. End caps 128 can be integral with the pins 125, extending radially from the ends of pins 125, or can be removably attached thereto. For the removable embodiments, a threaded bore extends axially into an end of the pin 125 and the end cap 128 includes a threaded stem that projects from a central portion of one of the surfaces of the cap 128, in a bolt-like configuration, allowing the end cap 128 to be threaded and secured onto the pin 125.

Referring again to FIGS. 2-5, the limiter assembly includes limiters 150 that are generally triangular or similar in shape to the shelves 45 and windows 49 of the hub 30, and provide mechanical stops or abutments that establish the ends or maximum travel positions of the weights 110 as the weights 110 move between first and second stopping positions. Each limiter includes a retaining bracket 155 and resilient walls 160. The walls 160 of this embodiment are made from an elastomeric material and are molded to or otherwise provided on the retaining bracket 155. The walls 160 of limiters 150 define stopping surfaces at their respective outwardly facing surfaces and are configured to be inserted through the windows 49 of hubs 30 so that the retaining brackets 155 sit against surfaces of shelves 45 that face the torque converter 60. In this configuration, the limiters 150 nest against the shelves 45 and tangentially abut the middle opening 22 of the inner plate 20. This nested relationship allows mounting hardware to extend through aligned holes and connect the limiters 150 to the shelves 45 and register the stopping surfaces of the walls 160 so that they face the weights 110.

Referring now to FIG. 3, when the weight 110 is in one of its first and second stopping positions, it is supported at both ends by a pair of limiters 150. Abutting surfaces of the limiters 150 and the weight 110 define respective interface lengths that can have different magnitudes, whereby one of the limiters 150 can be covered to a greater extent than the other. At least one of the pairs of abutting surfaces of the bottom wall 112 of weight 110 and the walls 160 of the limiters 150 defines an interface length that is greater than about 10% of an overall length of the weight 110. Optionally, such interface length is greater than about 25% of the overall length of the weight 110.

The elastomeric material from which the walls 160 are made is selected to give or flex enough when the weights 110 strike the walls 160 to prevent noise, without being so bouncy so as to impart rebounding type oscillatory deflections of the weights. For example, the walls 160 can be made from elastomeric materials having a coefficient of restitution of less than about 12%, optionally less than about 10%, less than about 5%, or about 3%.

In some embodiments, when the weight 110 moves to either of the first and second stopping positions, the first and second ends 116, 118 of the weight 110 engage a pair of limiters 150 simultaneously. By supporting the ends 116, 118 of the weight 110 by limiters 150 positioned outwardly beyond the weight's 110 center of gravity, the weight's 110 travel or movement can be stopped without applying turning moments to the weight 110. This ensures that the weight 110 does not deviate from the intended travel path and timing according to its tuning.

Figure 6:
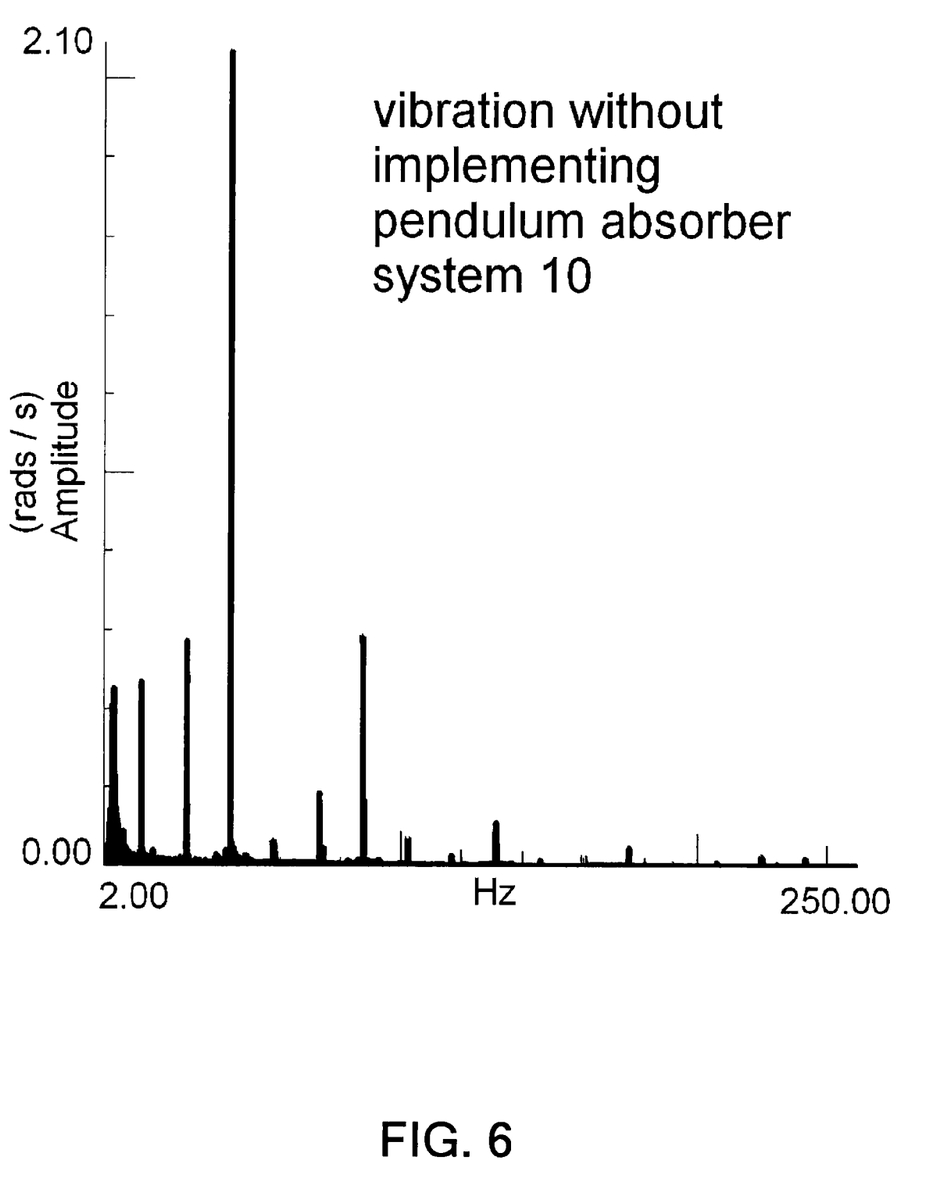
FIG. 6 is a graph of torsional vibration amplitude as a function of frequency, without implementing the pendulum absorber system of FIG. 1.
Figure 7:
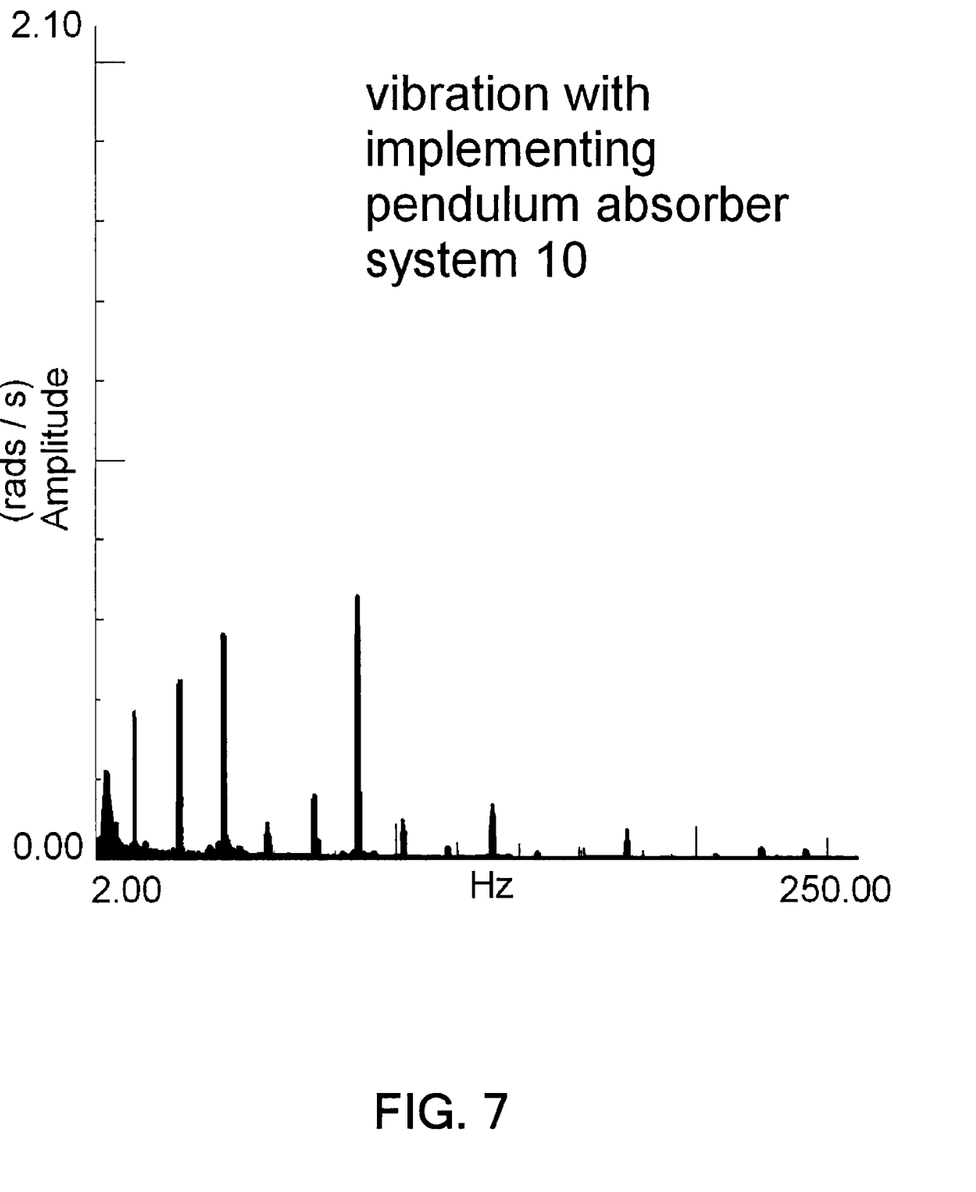
FIG. 7 is a graph of torsional vibration amplitude as a function of frequency, of a drive train implementing the pendulum absorber system of FIG. 1.

Referring now to FIGS. 6 and 7, the illustrated graphs show test results of torsional vibrations measured at a flex plate ring gear of a Chrysler 3.8 L V-6 MDS (Multi-Displacement System) engine being operated in MDS mode, i.e., utilizing only three of the six cylinders to generate power, at 1750 RPM (rotations per minute) without implementing the pendulum absorber system 10 (FIG. 6) and with implementing the pendulum absorber system (FIG. 7). By operating on three cylinders, a 1.5 order dominant torsional vibration was expected and realized, seen in FIG. 6 as the amplitude spike that exceeds 2.10 radians/second at approximately 45 Hz. However, as seen in FIG. 7, it is noted that the magnitude of such amplitude spike was substantially reduced, experiencing about a 70% reduction, while no overly burdensome amplification was seen at other orders (corresponding to other frequencies shown as Hz values along the x-axis).

During testing, pendulum absorber system 10 substantially smoothed out torsional surging by correcting vibrations according to order and not a specific frequency, whereby pendulum absorber system 10 corrects torsional vibrations for any mean speed. For example, the pendulum absorber system 10 produced corrections of the 1.5 order dominant torsional vibration of the Chrysler 3.8 L V-6 MDS engine (in three cylinder mode) of about 60%-70% reductions across an entire engine RPM range for which the weights 110 are forced into their tuned oscillatory movement. Such RPM range extends from about idle to about 3,000 RPM, at which point the Chrysler 3.8 L V-6 MDS engine reverts to 6-cylinder mode which in and of itself eliminates the 1.5 order dominant torsional vibrations.

Namely, during testing, average correction for runs at 1500 RPM, 1750 RPM, 2000 RPM, and 2250 RPM was about 64.17% reduction of the 1.5 order dominant torsional vibration. This was achieved, substantially, without amplifying other orders of torsional vibration. Worth noting is that the percent effectiveness of the pendulum absorber system 10 at attenuating the torsional vibrations increases a function of a magnitude of the torsional vibrations.

In other words, when torsional vibrations are worse, the pendulum absorber system 10 is more effective and cancels such torsional vibrations to a greater extent. Likewise, when there are relatively small torsional vibrations, the weights pendulum absorber system 10 does relatively less work and, percentage wise, cancels a smaller amount of nominal vibrations. Accordingly, when the 3.8 L V-6 MDS engine reverts to 6-cylinder mode, or if the engine is otherwise outside of the operating range in which the weights 110 are forced into their tuned oscillatory motion, the weights 110 can essentially rotate in unison with the hub 30. Incidental movement fluctuations or bumping of the weights 110 against the limiters 150 do not throw the weights 110 into a chaotic movement state that could amplify other vehicle vibrations or create noise. That is because, as described elsewhere herein, incidental and other engagements of the weights 110 with the stopping surfaces of limiters 150 do not introduce turning moments to the weights 110, because both of the first and second ends 116, 118 of the weights 110 engage adjacent limiters 150, substantially simultaneously.

Stopping characteristics of the weights 110 as they contact the limiters 150 are influenced by, amongst other factors, approach angles defined between the movement paths of the weights 110 and the limiters. Correspondingly, stopping characteristics can be controlled along with the other operational parameters while tuning the pendulum absorber system 10 by, for example, selecting size, shape, and mass of the weights 110, as well as selecting the configuration(s) of the tracks 126, 26, and 36, and pins 125. For typical implementations, the profiles of tracks 126, 26, and 36 are non-circular and are selected from a cycloid family of curves, preferably an epicycloidal curve, based on the particular intended end-use configuration and performance characteristics. The particular movement or travel paths defined by the profiles of tracks 126, 26 and 36 forces the weights 110 to mutate in a manner that provides an opposing counter-torque with respect to the rotating components to which the pendulum absorber system 10 is mounted, mitigating the torsional surging disturbances that are encountered without implementing pendulum absorber system 10.

It is noted that the pendulum absorber system 10 has been illustrated and described herein as being incorporated into a flex plate assembly. However, it is fully appreciated that the various components of the pendulum absorber system 10, their structures and respective functions, can be incorporated into other components of the drive train 2. For example, the inner plate 20 and hub 30 can be integrated into the forward facing pump cover of the torque converter 60, and the absorber assembly 100 can be housed in the void space between the inner plate 20 and hub 30 in the same way as described herein. Optionally, the pendulum absorber system 10 could be configured as a stand-alone unit that extends between and connects a conventional flex plate and the torque converter 60. In such configuration, the inner plate 20 could include screw bosses and/or corresponding hardware for attaching it to the conventional flex plate, while the hub 40 can retain the same configuration as described herein for attaching it to the torque converter 60, whereby the absorber assembly 100 is again housed in the void space between the inner plate 20 and hub 40.

Also, although the limiter assembly has been shown and described in terms of an embodiment having multiple distinct limiters 150, depending on the particular end-use configuration, for example, space available within a particular end-use absorber system 10, the multiple limiters 150 of the limiter assembly can be connected to or integrated into each other to form a single unitary limiter 150 that can be engaged by the multiple weights 110. This can be accomplished by connecting corresponding ends of adjacent limiters 150 to each other, forming a single limiter 150 that defines a continuous outer perimeter which lies outsides of and extends entirely around the central flange 50 of hub 30. Such embodiments, like the others described herein, can stop movement of a weight 110 when both the first and second ends 116, 118 of the weight 110 engage a continuously extending length of one of the walls 160 of limiter 150. Accordingly, such embodiment of the limiter 150 stops movement of the weight 110 by supporting the weight 110 on opposing sides of the weight's 110 center of gravity, optionally also supporting from a location that is directly under and aligned with such center of gravity, so that substantially no turning moments are applied to the weight 110 as the weight 110 engages the limiter 150.

Various alternatives are contemplated as being within the scope of the following claims particularly pointing out and distinctly claiming the subject matter regarded as the invention. It is also to be understood that, although the foregoing description and drawings describe and illustrate in detail one or more preferred embodiments of the present invention, to those skilled in the art to which the present invention relates, the present disclosure will suggest many modifications and constructions, as well as widely differing embodiments and applications without thereby departing from the spirit and scope of the invention.

It is claimed:

1. A pendulum absorber system for a vehicle comprising:
a hub operably coupled to a crankshaft of an engine and having a track extending into a surface thereof;
an inner plate connected to the hub and being positioned between the hub and the engine, portions of the inner plate and the hub being spaced from each other such that a void space is defined therebetween, the inner plate having a surface with a track extending thereinto;
a weight having a first end and a second end, the weight being housed within the void space between the inner plate and the hub, the weight being guided by the tracks of the inner plate and the hub and defining a travel path between a first stopping position and a second stopping position; and
a limiter assembly comprising a pair of limiters, one of the limiters being engaged by the first end of the weight and the other one of the limiters being engaged by the second end of the weight when the weight is in each of the first stopping position and the second stopping position, wherein the limiters are spaced apart from each other such that the pair of limiters does not contact an entire bottom surface of the weight, and wherein each limiter comprises a first stopping surface and a second stopping surface that extend angularly away from each other, the first stopping surface facing the weight and the second stopping surface facing a second weight.

2. The pendulum absorber system of claim 1, wherein the pair of limiters is constructed such that, when the weight moves to either of the first stopping position and the second stopping position, the first end and the second end of the weight contact the pair of limiters simultaneously.

3. The pendulum absorber system of claim 2, further comprising multiple tracks of the inner plate and multiple tracks of the hub and a pair of pins extending through the first end and the second end of the weight and being slidingly housed in respective tracks of the inner plate and tracks of the hub.

4. The pendulum absorber system of claim 3, wherein at least the tracks of the inner plate extend through the entire thickness of the inner plate or the tracks of the hub extend through the entire thickness of the hub, and wherein the pins extend through the at least one of the hub and the inner plate, each of the pins further comprising a cap attached to an end thereof which axially retains the pin in a respective one of at least the tracks of the inner plate or the tracks of the hub.

5. The pendulum absorber system of claim 1, the inner plate having a middle opening extending axially therethrough, the middle opening of the inner plate sitting concentrically outside of the crankshaft of the engine, and wherein each one of the limiters tangentially abuts the middle opening of the inner plate.

6. The pendulum absorber system of claim 5, wherein the stopping surface of each one of the limiters are aligned with each other.

7. The pendulum absorber system of claim 6, wherein the bottom surface of the weight is flat and faces an axis of rotation of the pendulum absorber system.

8. The pendulum absorber system of claim 7, wherein the flat bottom surface of the weight (i) entirely covers a respective stopping surface of one of the limiters when the weight is in the first stopping position, and (ii) partially covers a respective stopping surface of the other one of the limiters when the weight is in the first stopping position.

9. The pendulum absorber system of claim 1, wherein each limiter further comprises an apex defined at a point of intersection between the first stopping surface and the second stopping surface.

10. A pendulum absorber system for a vehicle comprising:
a hub operably coupled to a crankshaft of an engine and having tracks extending into a surface thereof; and
an absorber assembly attached to the hub and including,
a weight that dynamically moves with respect to the hub, in response to variations in rotational velocity of the hub; and
a pair of limiters positioned between the weight and an axis of rotation of the hub, the pair of limiters stopping the dynamic movement of the weight so as to define a first stopping position and a second stopping position of the weight when the weight abuts one of the limiters, wherein the limiters are spaced apart from each other such that the pair of limiters abuts a bottom surface of the weight via only a portion of the bottom surface, and wherein the limiters have a coefficient of restitution of less than about 12%, and wherein the weight is guided by the tracks of the hub and a pair of pins extending through the first end and the second end of the weight and being slidingly housed in the tracks.

11. The pendulum absorber system of claim 10, wherein the limiters are made from an elastomeric material having a coefficient of restitution of less than about 10%.

12. The pendulum absorber system of claim 11, wherein the limiters are made from an elastomeric material having a coefficient of restitution of less than about 5%.

13. The pendulum absorber system of claim 10, wherein, when the weight is in one of the first stopping position and the second stopping position, a length of abutting surfaces of the pair of limiters and the weight is greater than about 10% of an overall length of the weight.

14. The pendulum absorber system of claim 13, wherein the length is greater than about 25% of the overall length of the weight.

15. The pendulum absorber system of claim 14, wherein, when the weight is in one of the first stopping position and the second stopping position, the weight is supported at each of a first end and a second end by the pair of limiters, respectively.

16. A vehicle drive train comprising:
an engine having a crankshaft,
a flex plate assembly connected to the crankshaft of the engine;
a torque converter connected to the flex plate assembly;
an automatic transmission connected to the torque converter; and
an absorber assembly provided in at least one of the flex plate assembly and the torque converter, and including,
a weight having a first end and a second end and being movable along a travel path defined between a first stopping position and a second stopping position; and
a limiter assembly comprising a first limiter and a second limiter that are spaced apart from each other such that the first limiter and the second limiter contact only a portion of a bottom surface of the weight and are engaged by the first end and the second end of the weight when the weight is in both the first stopping position and in the second stopping position, and wherein the weight is guided by multiple tracks and a .air of sins extending through the first end and the second end of the weight and is slidingly housed in the tracks.

17. The vehicle drive train of claim 16, wherein the travel path of the weight is epicycloidal.

18. The vehicle drive train of claim 16, wherein the bottom surface of the weight faces an axis of rotation of the absorber assembly and abuts the first limiter and the second limiter when the weight is in both the first stopping position and the second stopping position.

19. The pendulum absorber system of claim 1, wherein at least one of the limiters is engaged by the second weight when the second weight is in each of a first stopping position and a second stopping position.

20. The pendulum absorber system of claim 3, wherein the travel path of the weight is epicycloidal.

21. The pendulum absorber system of claim 1, wherein the travel path of the weight is epicycloidal.

22. The pendulum absorber system of claim 10, wherein the weight moves along a travel path that is epicycloidal.

23. The pendulum absorber system of claim 10, wherein the weight moves along a travel path that is epicycloidal.

24. The pendulum absorber system of claim 16, wherein the travel path of the weight is epicycloidal.

* * * * *